(12) United States Patent
Akiyama

(10) Patent No.: US 8,526,741 B2
(45) Date of Patent: Sep. 3, 2013

(54) APPARATUS AND METHOD FOR PROCESSING IMAGE

(75) Inventor: Yuji Akiyama, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 751 days.

(21) Appl. No.: 12/568,597

(22) Filed: Sep. 28, 2009

(65) Prior Publication Data

US 2010/0080490 A1 Apr. 1, 2010

(30) Foreign Application Priority Data

Sep. 29, 2008 (JP) ................................. 2008-250528

(51) Int. Cl.
*G06K 9/00* (2006.01)

(52) U.S. Cl.
USPC .......................................... 382/190; 382/103

(58) Field of Classification Search
USPC .......................................... 382/190, 291, 103
See application file for complete search history.

(56) References Cited

U.S. PATENT DOCUMENTS

| 6,222,947 | B1 * | 4/2001 | Koba ............................. 382/284 |
| 7,515,294 | B2 * | 4/2009 | Yamazoe et al. ............. 358/1.18 |
| 2004/0190754 | A1 * | 9/2004 | Sakagami et al. ............ 382/103 |
| 2005/0111737 | A1 * | 5/2005 | Das et al. ...................... 382/190 |
| 2006/0204135 | A1 * | 9/2006 | Funakura ....................... 382/291 |
| 2006/0213386 | A1 | 9/2006 | Funakura |
| 2006/2004135 | | 9/2006 | Funakura |
| 2007/0104374 | A1 * | 5/2007 | Terakawa ...................... 382/190 |
| 2008/0028298 | A1 * | 1/2008 | Kaneko ......................... 715/243 |
| 2008/0285791 | A1 | 11/2008 | Suzuki |

FOREIGN PATENT DOCUMENTS

| JP | 2006-287917 | | 10/2006 |
| JP | 2006-304265 | | 11/2006 |
| JP | 2007-012030 | | 1/2007 |
| JP | 2007-026387 | A | 2/2007 |
| JP | 2007-180651 | A | 7/2007 |
| JP | 2007-219878 | A | 8/2007 |
| JP | 2007-312058 | A | 11/2007 |
| JP | 2008-205838 | | 9/2008 |

* cited by examiner

*Primary Examiner* — Hadi Akhavannik

(74) *Attorney, Agent, or Firm* — Canon USA, Inc., IP Division

(57) ABSTRACT

For automatically laying out a plurality of images, the present invention includes an image input unit which inputs an image; an analysis unit which analyzes the orientation of a principal object and the position of the principal object in the image from the image input by the image input unit; and a layout unit which places the image in accordance with the information analyzed by the analysis unit.

9 Claims, 13 Drawing Sheets

| ORIENTATION OF FACE | MAIN SUBJECT POSITION | LAYOUT |
|---|---|---|
| LEFT | A LITTLE TO THE LEFT | RIGHT SIDE (RIGHT-HAND PAGE) |
| | CENTER | RIGHT SIDE (RIGHT-HAND PAGE) |
| | A LITTLE TO THE RIGHT | RIGHT SIDE (RIGHT-HAND PAGE) |
| CENTER | A LITTLE TO THE LEFT | RIGHT SIDE (RIGHT-HAND PAGE) |
| | CENTER | CENTER (OR NO LIMITATION) |
| | A LITTLE TO THE RIGHT | LEFT SIDE (LEFT-HAND PAGE) |
| RIGHT | A LITTLE TO THE LEFT | LEFT SIDE (LEFT-HAND PAGE) |
| | CENTER | LEFT SIDE (LEFT-HAND PAGE) |
| | A LITTLE TO THE RIGHT | LEFT SIDE (LEFT-HAND PAGE) |

FIG. 4

| ORIENTATION OF FACE | MAIN SUBJECT POSITION | LAYOUT |
|---|---|---|
| LEFT | A LITTLE TO THE LEFT | RIGHT SIDE (RIGHT-HAND PAGE) |
| LEFT | CENTER | RIGHT SIDE (RIGHT-HAND PAGE) |
| LEFT | A LITTLE TO THE RIGHT | RIGHT SIDE (RIGHT-HAND PAGE) |
| CENTER | A LITTLE TO THE LEFT | RIGHT SIDE (RIGHT-HAND PAGE) |
| CENTER | CENTER | CENTER (OR NO LIMITATION) |
| CENTER | A LITTLE TO THE RIGHT | LEFT SIDE (LEFT-HAND PAGE) |
| RIGHT | A LITTLE TO THE LEFT | LEFT SIDE (LEFT-HAND PAGE) |
| RIGHT | CENTER | LEFT SIDE (LEFT-HAND PAGE) |
| RIGHT | A LITTLE TO THE RIGHT | LEFT SIDE (LEFT-HAND PAGE) |

APPARATUS AND METHOD FOR PROCESSING IMAGE

BACKGROUND OF THE INVENTION

1. Field of the Invention

The present invention relates to a method for processing an image and a recording medium that stores the method. In particular, the invention relates to an image processing method that automatically places a plurality of image data items using the orientation of a principal object and its position in the image, as well as a recording medium that stores the method.

2. Description of the Related Art

As a method for using pictures, albums have conventionally been created by sticking pictures that are printed by developing film onto a mount.

In recent years, creation of albums on digital data becomes possible by digitizing images, so that users have become able to easily create albums while changing mount design or layout.

The creation of albums using digital data is easier and more flexible than the conventional method of sticking printed paper.

The creation of albums using digital data has become popular as digital cameras have become widespread, while the number of items of photographed image data has increased with increasing memory capacity.

As a result, this produces a new problem in that when users create albums using digital data, it takes much time to select images from a large number of images and place them.

To solve these problems, Japanese Patent Laid-Open No. 2006-287917 discloses a method for laying out images by specifying the orientations of objects (main objects), such as persons, in the images using the faces, bodies, the lines of sight, etc. and performs layout of the images on the basis of the specified orientations.

Japanese Patent Laid-Open No. 2006-304265 discloses a method for laying out images by calculating the directional components of images from their spatial frequency levels etc. and laying out the images on the basis of the calculated directional components.

Furthermore, Japanese Patent Laid-Open No. 2007-012030 discloses a method for laying out images by trimming the images and moving the positions of the objects so that the main objects in the images do not fall along the fold between pages and a method for placing images by determining whether a main object overlaps with another image in the album template and if they overlap, trimming the image and moving the position of the object.

As described in the related arts, although the methods for determining layout using the orientation of a main object are disclosed, some images have a plurality of principal objects.

The related arts do not show a method for determining the orientation in the case where a plurality of principal objects are present in an image, and there is also an image in which the orientation cannot be determined.

To perform balanced layout, it is necessary to consider not only the orientation of the principal object but also the location of the principal object. Although there is a technology for performing trimming depending on the orientation of the main object, there are many cases in which there is no enough area on the background of the principal object, so that the image cannot be trimmed at appropriate location of the principal object.

In laying out pictures on an album or the like, providing a space in the orientation of the principal object (including the direction of the line of sight) allows dynamic and wide reproduction.

Meanwhile, a viewer's point of view tends to be focused on the center of the layout mount of an album. Therefore, it is desirable to locate the principal object in the center as much as possible.

Accordingly, the principal object should be located at a desirable position of the final image layout in consideration of not only the orientation of the principal object but also the positional relationship of the principal object.

SUMMARY OF THE INVENTION

The present invention is made in consideration of the above-described problem.

According to an aspect of the present invention, there is provided an automatic layout apparatus which automatically places a plurality of images, the apparatus including an image selection unit which selects an image; an analysis unit which analyzes the orientation of a principal object specified in the image selected by the image selection unit and the position of the principal object in the image; and a layout unit which determines a position in which the image is to be placed in accordance with information analyzed by the analysis unit.

In the present invention, in laying out a plurality of image data items, the orientation of a principal object (the face of a person) and the position thereof in the image are analyzed, and the image data is laid out using the analytical result. This allows appropriate image layout.

Further features of the present invention will become apparent from the following description of exemplary embodiments with reference to the attached drawings.

BRIEF DESCRIPTION OF THE DRAWINGS

FIG. 4 is a diagram of layout definition based on analytical results of image data.

DESCRIPTION OF THE EMBODIMENTS

First Embodiment

Figure 1:
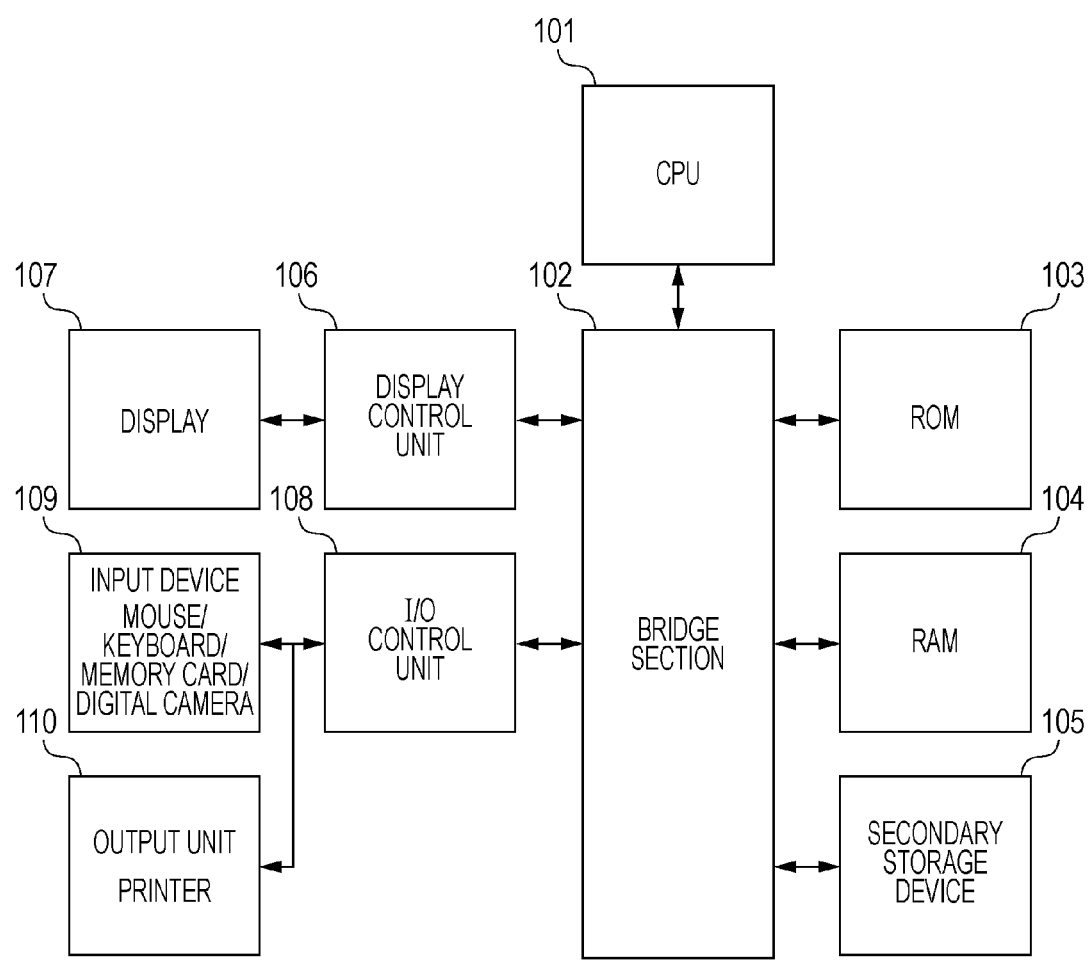
FIG. 1 is a block diagram of an album creating apparatus.

FIG. 1 shows a block diagram of an image processing apparatus used in the present invention, in which it is assumed to use a PC.

A CPU 101 is a central processing unit, which controls the other functional blocks and units. A bridge section 102 provides the function of controlling data exchange between the CPU 101 and the other functional blocks.

A read only memory (ROM) 103 is a read-only nonvolatile memory, in which a program called a basic input/output system (BIOS) is stored. The BIOS is a program that is first executed when an image search device is started and controls the basic input/output functions of peripheral devices, such as a secondary storage device 105, a display 107, input devices 109, and an output unit 110.

A random access memory (RAM) 104 provides a high-speed readable/writable storage region.

The secondary storage device 105 is a hard disk drive (HDD) that provides a mass storage region. When the BIOS is executed, an operating system (OS) stored in the HDD is executed. The OS provides basic functions that can be used in all applications, management of the applications, and a basic graphical user interface (GUI). The applications can provide user interfaces that achieve functions specific to the applications by combining the GUIs provided by the OS.

Data used in the OS and execution programs and jobs of the other applications are stored in the RAM 105 or the secondary storage device 105 as necessary.

A display control unit 106 performs control to generate the result of user's operation performed on the OS or applications as image data of the GUI and to display it on the display 107. The display 107 can be a liquid crystal display or a cathode ray tube (CRT) display.

An I/O control unit 108 provides an interface with the plurality of input devices 109 and the output unit 110. A typical interface is a universal serial bus (USB).

Examples of the input devices 109 are a keyboard and a mouse for inputting user's intention to the image search device. Furthermore, image data can be transferred by connection with a memory device, such as a digital camera, a USB memory, a compact flash (CF) memory, or a secure digital (SD) memory card.

The output unit 110 connects to a printer, thus allowing a desired print result to be obtained.

Figure 2:
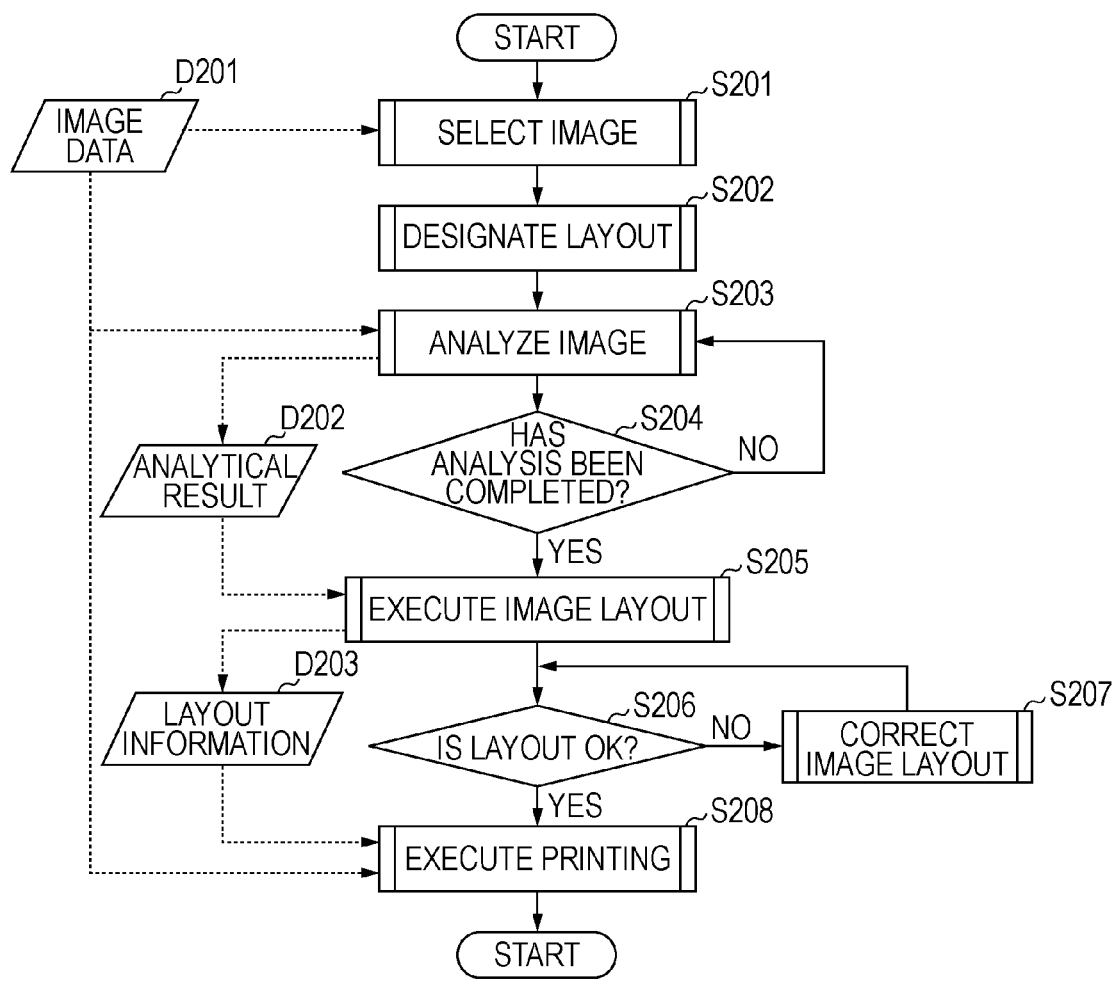
FIG. 2 is an overall flowchart of an album creation application.

FIG. 2 is a flowchart for the operation of an image processing method according to an embodiment of the present invention.

Image data D201 is stored in the storage region of the secondary storage device 105 or the storage region of the input device 109, such as a CF memory or a SD memory card, connected to the I/O control unit 108. This image data D201 is captured using an image-capturing device, such as a digital camera.

In step S201, a user who wants to create an album selects an image group to be used as image data for the album from the image data D201. As a method for selection, a method of first displaying the thumbnail images of the stored image data D201 and designating desired images therefrom is often used.

Figure 3:
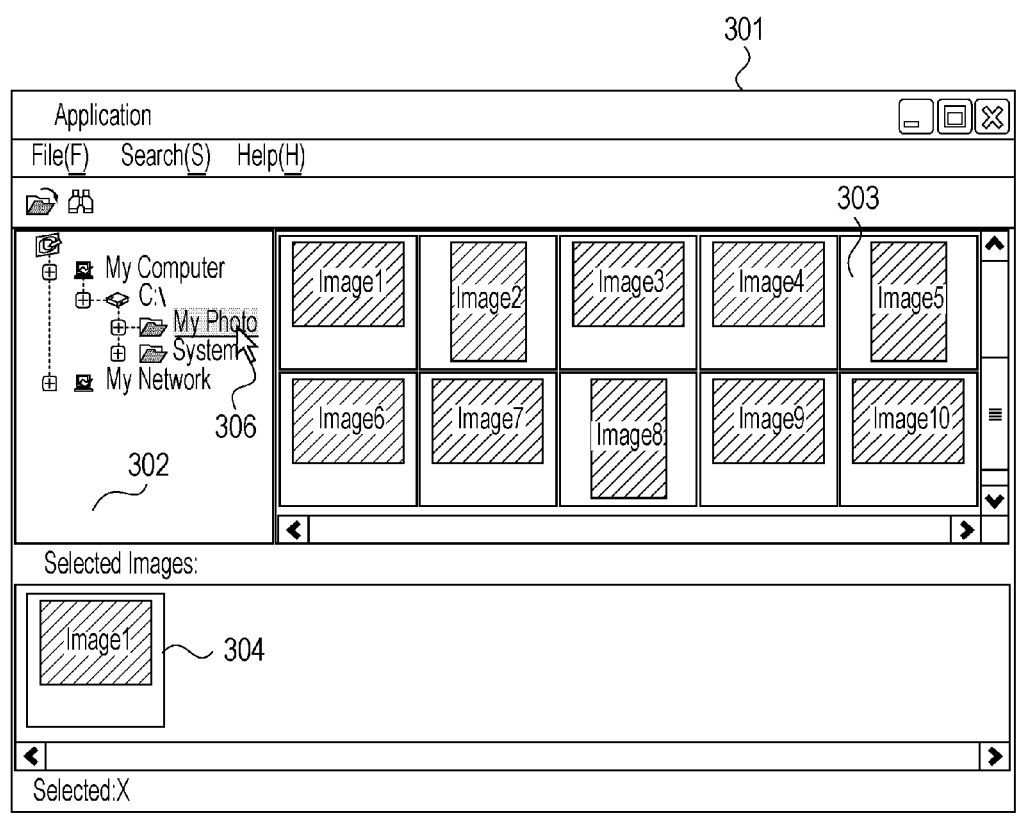
FIG. 3 is a diagram of an image selection UI of the album creation application.

FIG. 3 shows an example the UI for such image selection. As a UI for image selection of an album creation application 301, a directory-tree display region 302 that presents the storage region of the image data displays the configuration of folders stored in the secondary storage device 105.

A mouse pointer 306 designates a point position of a mouse, which is one of the input devices 109. The user can select image data by operating the mouse or the keyboard.

The user designates one folder. Image data in the designated folder is displayed as thumbnail images in a thumbnail display region 303.

A list of images that the user selects using the mouse pointer 306 is displayed in a region 304 as thumbnail images.

In step S202, the user performs the operation to designate the structures of the individual pages of the album. For example, the user designates the maximum number of images, the sticking positions of the individual images, the sizes, etc. as a layout of one page. All of such layout control information may be designated by the user or may be automatically determined from the number of selected images.

In step S203, the orientation of a principal object in the image data selected in step S202 and the position in the image are analyzed.

The following description is made assuming that the principal object here is the face of a person.

The orientation here means the orientation of the principal object or the direction of the line of sight.

In this specification, the principal object is the face of a person; alternatively, it is also possible to specify an organic region, such as eyes, to specify the orientation of the face, the direction of the line of sight, and the position in the image.

Various methods for detecting the principal object are disclosed in various documents, any of which may be used in this embodiment; for example, Patent Laid-Open No. 2006-304265, US Publication No. 20080285791. For the detection of the face or the organ and the determination of the orientation of the face or the direction of the line of sight, conventional methods are disclosed in various documents and they are not essential part of the present invention, and therefore, detailed description thereof will be omitted here.

In step S203, the image data is analyzed, and the result is stored in an analytical result D202. In step S204, it is determined whether all the image data selected in step S201 has been analyzed, and the step S203 is repeatedly executed until the analysis of all the image data is completed. When the analysis of all the image data is completed, the process proceeds to step S205, where layout of the images is executed.

FIG. 4 shows layout definition based on the analytical results of image data.

If the orientation of the face analyzed in step S203 is the left, the image is placed on the right of the layout template or on the right-hand page in step S205 irrespective of the position of the face in the image, that is, the position of the principal object. In contrast, if the orientation of the face is the right, the image is placed on the left of the layout template or on the left-hand page in step S205 irrespective of the position of the face in the image, that is, the position of the principal object.

If the orientation of the face analyzed in step S203 is the center, and the position of the face in the image, that is, the position of the principal object, is a little to the left, the image is placed on the right of the layout template or on the right-hand page in step S205. On the other hand, if the orientation of the face is the center and the position of the face in the image, that is, the position of the principal object, is a little to the right, the image is placed on the left of the layout template or on the left-hand page in step S205. If the orientation of the face is the center, and the position of the face in the image, that is, the position of the principal object, is also the center, the image is placed at the center of the layout template, or determination of the priority level of the placement position is not performed in step S205.

The position of the principal object in the image can be obtained from the position of the center of gravity of the principal object, in the image, obtained by calculating the center of gravity of the face region, that is, the center of gravity of the principal object, from the position of the face analyzed in step S203.

Figure 11:
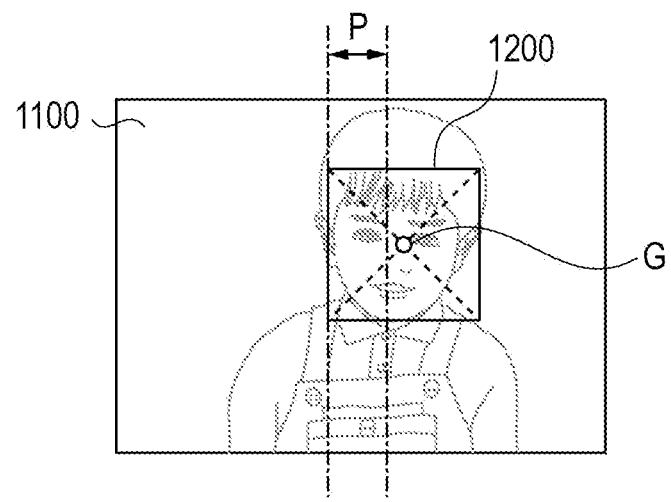
FIG. 11 is a diagram showing a method for calculating the center of gravity of a face region, that is, the center of gravity of the principal object in the image in the case where there is one principal object.

FIG. 11 shows a method for calculating the center of gravity of the face region, that is, the center of gravity of the principal object in the image in the case where there is one principal object (one face).

A face region 1200 of an image 1100 in the image data D201 is obtained by the analysis in step S203. The face region 1200 is obtained as a rectangular region, as shown in FIG. 11. The point of intersection of the lines extending from the vertexes of the rectangular region is obtained as the center of gravity of the face region 1200, that is, the center of gravity G of the principal object.

Reference sign P in FIG. 11 denotes a central region having a predetermined width in the image 1100. If the center of gravity G of the principal object is within the central region P, it is determined that the principal object is located at the center of the image.

If the center of gravity G of the principal object is at the left of the central region P, it is determined that the principal object in the image is located a little to the left, and if the center of gravity G of the principal object is at the right of the central region P, it is determined that the principal object in the image is located a little to the right.

In the image in FIG. 11, the center of gravity G of the principal object is at the right of the central region P, so that it is determined that the principal object in the image is located a little to the right.

The range of the central region P is not limited to that shown in this embodiment and may be determined depending on the purpose. The method for calculating the center of gravity is also not limited to that shown in this embodiment, and a known unit may be used.

Figure 5A:
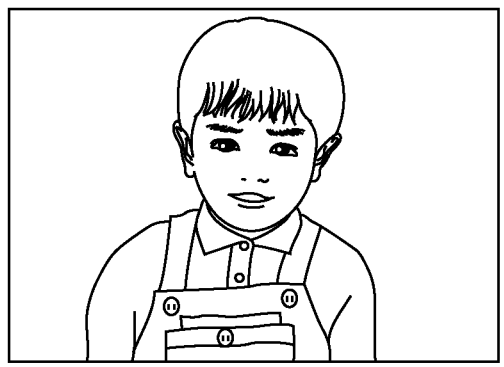
FIG. 5A is a diagram showing an image in which the orientation of the face is the center and the position of the face in the image is also the center.
Figure 5B:
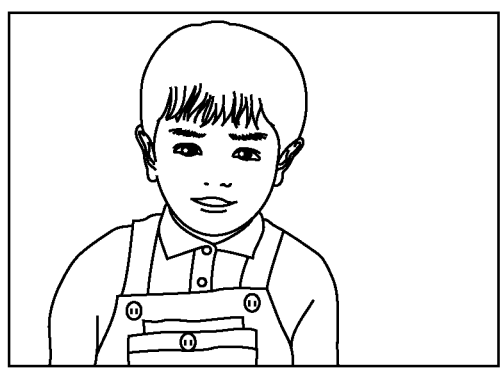
FIG. 5B is a diagram showing an image in which the orientation of the face is the center and the position of the face in the image is a little to the left.

FIGS. 5A to 5B show images in which the orientations of the faces are the center and the positions of the faces (principal objects) in the images are different.

FIG. 5A shows an image in which the orientation of the face is the center and the position of the face in the image is also the center. In this case, the placement of the face at the center of the layout template, or determination of the priority level of the placement position is not performed in step S205.

FIG. 5B shows an image in which the orientation of the face is the center and the position of the face in the image is a little to the left. In this case, the object is placed on the right of the layout template or on the right-hand page in step S205.

Figure 5C:
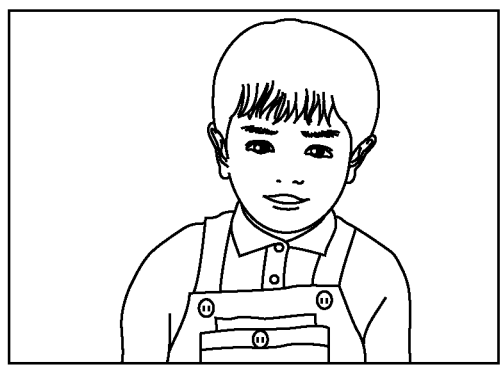
FIG. 5C is a diagram showing an image in which the orientation of the face is the center and the position of the face in the image is a little to the right.

FIG. 5C shows an image in which the orientation of the face is the center and the position of the face in the image is a little to the right. In this case, the object is placed on the left of the layout template or on the left-hand page in step S205.

Figure 6A:
FIG. 6A is a diagram showing an image in which the position of the face is the center.
Figure 6B:
FIG. 6B is a diagram showing an image in which the position of the face is a little to the left.
Figure 6C:
FIG. 6C is a diagram showing an image in which the position of the face is a little to the right.

FIGS. 6A to 6C show images in which the orientations of the faces are the left and the positions of the faces in the images are different.

FIG. 6A shows an image in which the position of the face is the center; FIG. 6B shows an image in which the position of the face is a little to the left; and FIG. 6C shows an image in which the position of the face is a little to the right. In these cases, all the images in FIGS. 6A to 6C are located on the right of the layout template or on the right-hand page.

In the above description, the orientation of the face is described only for the lateral direction; alternatively, an analytical result, such as a vertical direction or a diagonal direction, may be used.

In this case, the layout position is determined from the orientation of the face irrespective of the position of the face in the image, except when the orientation of the face is the center, and the object is placed in the position of the layout template or a page opposite to the orientation of the face.

After the layout is determined in step S205, as described above, layout information D203 for controlling the layout is stored. The layout information D203 includes the number of pages in the album, the names of images used, storage destination, the numbers of pages to which the images are stuck, and stuck positions in the pages. Alternatively, the layouts of the individual pages in the album may be generated and stored as image data. The storage destination may be either the secondary storage device 105 or the RAM 104.

In step S206, the result of layout is displayed to the user on the display 107 to determine whether the user is satisfied with the result. If the user is not satisfied, then the process proceeds to step S207, where the user adjusts the layout made in step S205. If the user is satisfied, then the process proceeds to step S208, where the album is printed and a series of jobs is terminated.

As has been described above, by analyzing the orientation of the principal object (the face of the person) in image data and the position thereof in the image and controlling the layout using the analytical result, a good layout can be achieved.

In the above description, the orientation of the face is used as the analytical result. Alternatively, the above-described process may be performed using the direction of the line of sight as the analytical result.

This embodiment is described using the method of performing layout by analyzing images that are selected in advance by the user. Alternatively, a method of automatically performing layout by analyzing image data taken in the image processing apparatus without the need for the user to select images in advance.

Second Embodiment

In the first embodiment, the method for controlling layout by analyzing the orientation of a principal object (the face of a person) in image data and the position thereof in the image and controlling the layout using the analytical result is described.

Although the first embodiment has been described in terms of the case where there is one principal object (one face), a case in which there are two or more principal objects is possible.

In the second embodiment, a method for controlling layout in the case where there are two or more principal objects.

Since the method for processing images is the same as that of the foregoing first embodiment, a detailed description thereof will be omitted.

Figure 10:
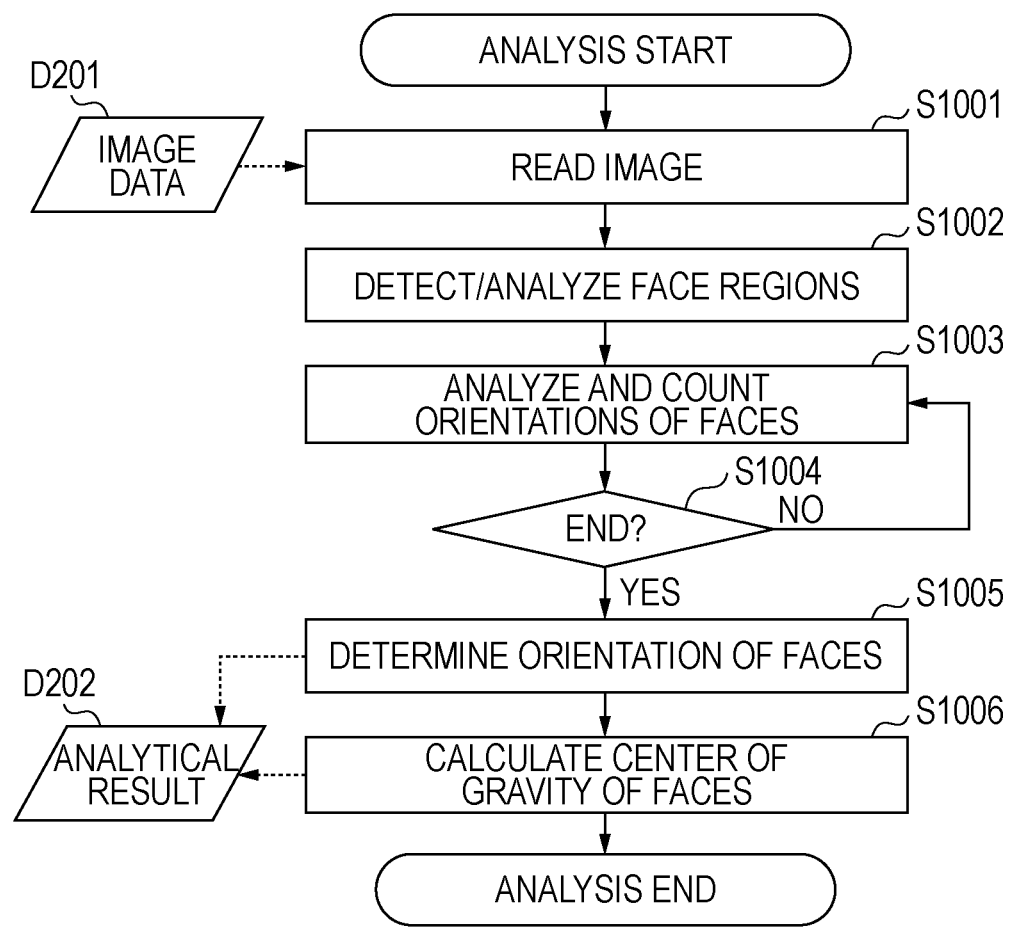
FIG. 10 is a detailed flowchart of image analysis in FIG. 2.

Referring to FIG. 10, a detailed flow of the image analysis in step S203 of FIG. 2 will be described.

In step S1001, image data is read from the image data D201, and next in step S1002, all face regions present in the image are detected and analyzed.

In step S1003, the orientations of the faces are analyzed from the result of extraction and analysis of the face regions in step S1002, and the number of faces in predetermined orientations is counted until it is determined in step S1004 that the process is completed.

In step S1005, the orientation of the faces is determined from the result in step S1003. An orientation having the largest count is finally written in the analytical result D202 as the orientation of the faces in the image. If it is not possible to evaluate the counts, that is, in the case where the orientations of all the faces are different, the orientation of the faces is finally determined to be the center, and is written in the analytical result D202.

In step S1006, the positions of the center of gravity are calculated from the face regions detected in step S1002, the positions of the principal objects in the image are obtained, and they are written in the analytical result D202.

Figure 7A:
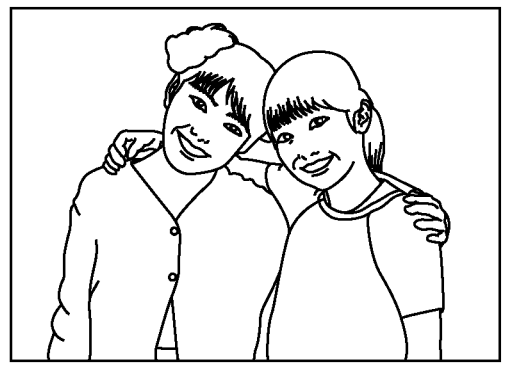
FIG. 7A is a diagram showing an image in which the faces of two persons face the center.
Figure 7B:
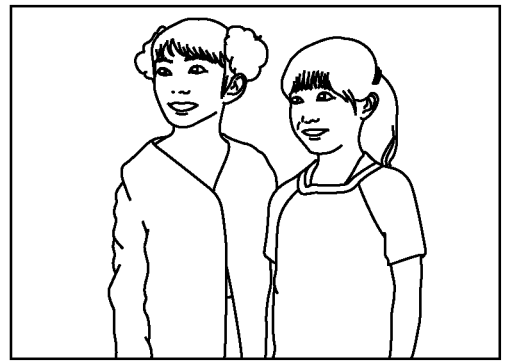
FIG. 7B is a diagram showing an image in which the faces of two persons face leftward.

FIGS. 7A and 7B show images including two objects who face in the same direction.

FIG. 7A shows an image in which the faces of the two persons face the center. In this case, it is determined in step S203 that the principal objects face the center. FIG. 7B shows an image in which the faces of the two persons face leftward. In this case, it is determined in step S203 that the principal objects face leftward.

The positions of the principal objects in the image can be obtained by calculating the centers of gravity of the face regions of the two persons from the positions of the faces of the two persons analyzed in step S203 and obtaining the center of the gravity of the principal objects in the image from the centers of the gravity of the faces.

Figure 12:
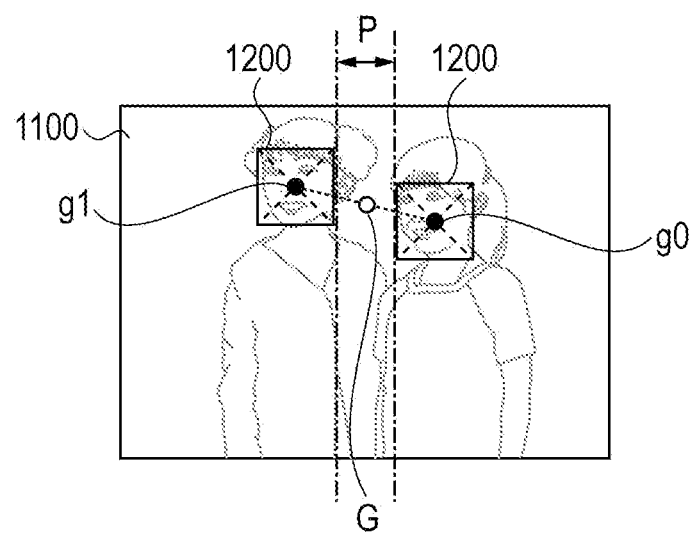
FIG. 12 is a diagram showing a method for calculating the centers of gravity of face regions and the center of gravity of principal objects in the image in the case where there are two principal objects.

FIG. 12 shows a method for calculating the centers of gravity of the face regions and the center of gravity of the principal objects in the image in the case where there are two principal objects (two faces).

Face regions 1200 of an image 1100 in the image data D201 are obtained by the analysis in step S203. The face regions 1200 are obtained as rectangular regions, as shown in FIG. 12. The points of intersection of the lines extending from the vertexes of the rectangular regions are obtained as the centers of gravity of the face regions, that is, the centers of gravity g0 and g1 of the face regions 1200.

Since there are two principal objects (faces) in the image 1100, it is necessary to obtain the center of gravity G of the principal objects for obtaining the positions of the principal objects.

The center of gravity G of the principal objects can be obtained from the midpoint on a line connecting the centers of gravity g0 and g1 of the face regions 1200.

Reference sign P in FIG. 12 denotes a central region having a predetermined width. If the center of gravity G of the principal objects is within the central region P, it is determined that the principal objects are located in the center of the image 1100.

If the center of gravity G of the principal objects is at the left of the central region P, it is determined that the principal objects in the image are located a little to the left, and if the center of gravity G of the principal objects is at the right of the central region P, it is determined that the principal objects in the image are located a little to the right of the image.

In the image in FIG. 12, the center of gravity G of the principal objects is within the central region P, so that it is determined that the principal objects in the image are located in the center.

The range of the central region P is not limited to that shown in this embodiment and may be determined depending on the purpose.

A layout is determined in step S205 on the basis the determination in step S203 in accordance with the definition of the table in FIG. 4.

In the case where there are a plurality of principal objects, the numbers of the orientations of the individual faces analyzed in step S203 are counted, and an orientation having the largest count is used as a final processing value.

Accordingly, even if there are two principal objects, if all of them face in the same direction, it can be determined in what direction the principal objects face.

Figure 8A:
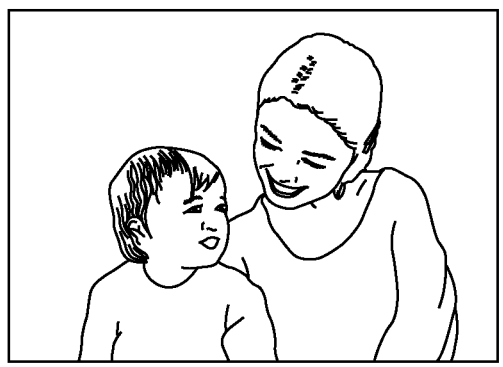
FIG. 8A is a diagram showing an image in which the faces of two persons face in different directions.
Figure 8B:
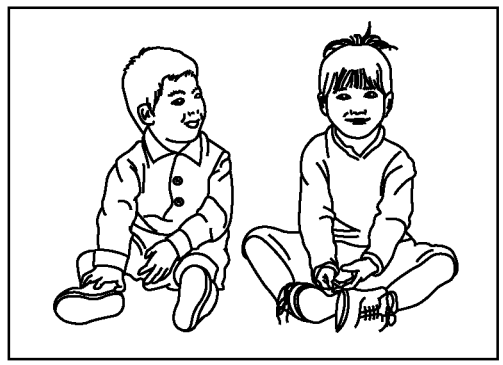
FIG. 8B is a diagram showing an image in which the faces of two persons face in different directions.

FIGS. 8A and 8B show images in which there are two objects who face in different directions.

In FIGS. 8A and 8B, the faces of the two persons face in different directions. In this case, they are processed in step S203 as images in which the principal objects face the center.

The positions of the faces in the images can be obtained from the center of gravity of the principal objects in the images obtained by calculating the centers of gravity of the two faces, by a known unit, from the positions of the two faces analyzed in step S203.

A layout is determined in step S205 by the determination in step S203 in accordance with the definition of the table in FIG. 4.

In the case where there are a plurality of principal objects, the numbers of the orientations of the individual faces analyzed in step S203 are counted, and an orientation having the largest count is used as a final processing value.

Accordingly, since there are two principal objects, who face in different directions, it is impossible to determine the orientations of the faces, and therefore, they are processed as images in which the principal objects face the center.

Figure 9A:
FIG. 9A is a diagram showing an image in which there are a plurality of objects.
Figure 9B:
FIG. 9B is a diagram showing an image in which there are a plurality of objects.

FIGS. 9A and 9B show images in which there are a plurality of objects.

In FIG. 9A, all of the faces of three persons face in different directions. In this case, as in the case in FIGS. 8A and 8B, they are processed in step S203 as images in which the principal objects face the center.

The positions of the principal objects in the images are obtained from the center of gravity of the principal objects in the images obtained by calculating the centers of gravity of the three face regions, by a known unit, from the positions of the three faces analyzed in step S203.

Figure 13A:
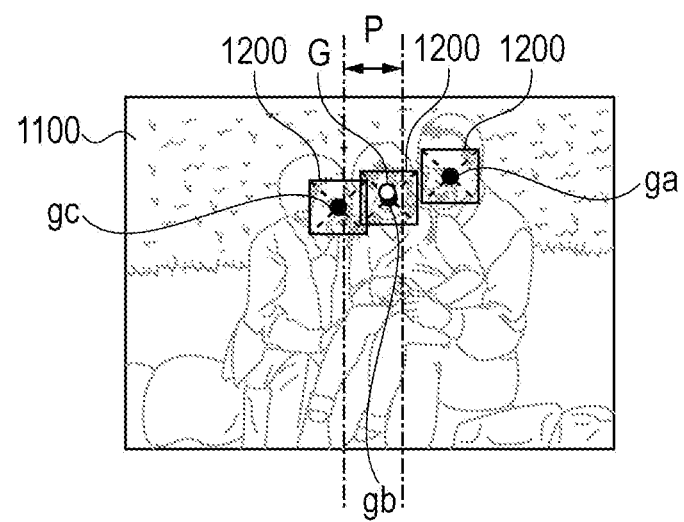
FIG. 13A is a diagram showing a method for calculating the centers of gravity of face regions and the center of gravity of principal objects in the image in the case where there are three principal objects.
Figure 13B:
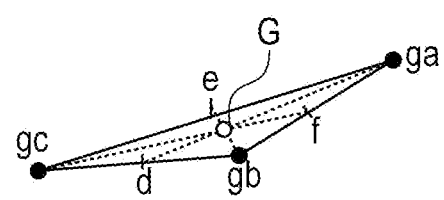
FIG. 13B shows a method for obtaining the center of gravity of the principal objects in the case where there are three principal objects.

FIGS. 13A and 13B show a method for calculating the center of gravity of the face regions and the center of gravity of the principal objects in the image in the case where there are three principal objects (faces).

In FIG. 13A, face regions 1200 of an image 1100 in the image data D201 are obtained by the analysis in step S203. The face regions 1200 are obtained as rectangular regions, as shown in FIG. 13A. The points of intersection of the lines extending from the vertexes of the rectangular regions are obtained as the centers of gravity of the face regions, that is, the centers of gravity ga, gb, and gc of the face regions 1200.

Since there are three principal objects (faces) in the image 1100, it is necessary to obtain the center of gravity G of the principal objects for obtaining the positions of the principal objects.

FIG. 13B shows a method for obtaining the center of gravity G of the principal objects.

Since the centers of gravity ga, gb, and gc of the face regions form a rectangle, a known method for obtaining the center of gravity of a rectangle can be applied. That is, provided that the midpoints of the three sides of the triangle ga, gb, and gc are d, e, and f, the point of intersection of three median lines that connect point ga and point d, point gb and point e, and point gc and point f is determined to be the center of gravity G of the principal objects.

Reference sign P in FIG. 13A denotes a central region having a predetermined width. If the center of gravity G of the principal objects is within the central region P, it is determined that the principal objects in the image are located in the center of the image.

If the center of gravity G of the principal objects is at the left of the central region P, it is determined that the principal objects in the image are located a little to the left, and if the center of gravity G of the principal objects is at the right of the central region P, it is determined that the principal objects in the image are located a little to the right.

In the image in FIG. 13A, the center of gravity G of the principal objects is within the central region P, so that it is determined that the principal objects in the image are located at the center.

The range of the central region P is not limited to that of this embodiment and may be determined depending on the purpose.

A layout is determined in step S205 from the determination in step S203 in accordance with the definition of the table in FIG. 4.

In the case where there are a plurality of principal objects, the numbers of the orientations of the individual faces analyzed in step S203 are counted, and an orientation having the largest count is used as a final processing value.

Accordingly, since there are three principal objects, who face in different directions, it is impossible to determine the orientations of the faces, and therefore, they are processed as an image in which the principal objects face the center.

In FIG. 9B, the faces of four of five principal objects except one at the right end face the front (center). In the case where there are a plurality of principal objects, the numbers of the orientations of the individual faces analyzed in step S203 are counted, and an orientation having the largest count is used as a final processing value.

Accordingly, since there are five principal objects, and the orientations of the faces of four persons face the center, the orientation of the faces can be determined as the center having the largest count.

The positions of the principal objects in the image can be obtained from the center of gravity of the principal objects in the image obtained by calculating the centers of gravity of the five faces, by a known unit, from the positions of the five faces analyzed in step S203.

The method for obtaining the centers of gravity of face regions and the center of gravity of principal objects in an image in the case where there are three principal objects (faces) has been described above. Even if the number of principal objects in an image increases, the center of gravity of face regions and the center of gravity of principal objects in the image can be obtained by the same method. The center of gravity of the principal objects in FIG. 9B can be obtained by a known method for obtaining the center of gravity of a polygon because connecting the centers of gravity of the face regions forms a pentagon.

As in the above description, the positions of the principal objects in the image can be obtained from the relationship between the predetermined central region and the center of gravity of the principal objects.

A layout is determined in step S205 from the determination in step S203 in accordance with the definition of the table in FIG. 4.

As a method for determining the orientation of the faces in the case where there are two or more principal objects, the method according to the orientation of objects having the largest count has been described. However, the present invention is not limited thereto, but it may be determined by weighing the orientations of the faces using the sizes thereof.

It is also possible to specify a target person from a plurality of principal objects using a person specifying unit and to determine the orientation of the face thereof.

The method for calculating the positions of the faces in the image from the centers of gravity of all the face regions has been described above. Also in this case, the positions of the faces may be calculated by weighing the orientations of the faces using the sizes thereof or specifying a target person from a plurality of principal objects using a person specifying unit and determining the orientation of the face thereof.

Figure 14:
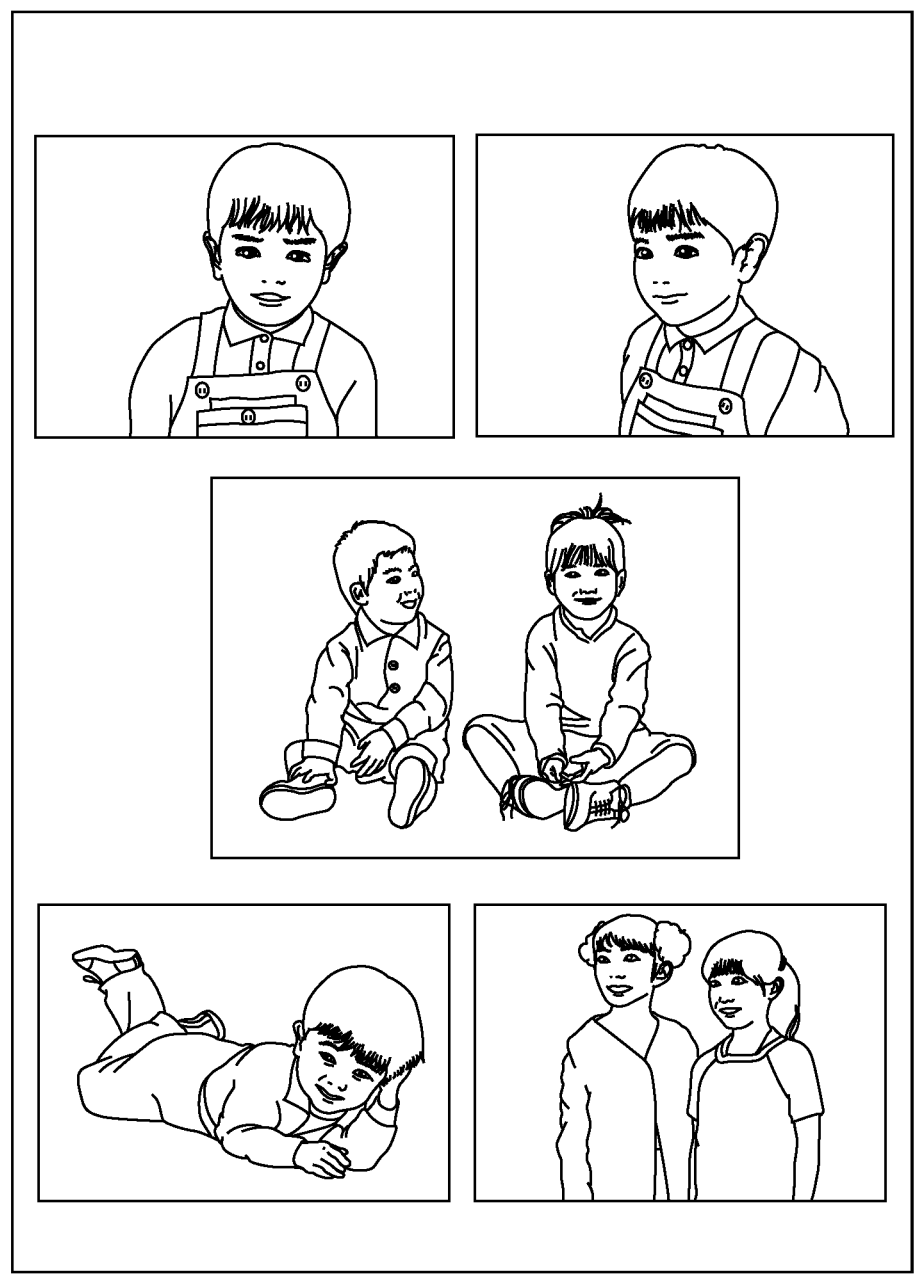
FIG. 14 is a diagram showing an example of an album layout.

FIG. 14 shows an example of a layout using the processes in the first and second embodiments.

Since the image is laid out in consideration of not only the orientations of the principal objects but also the positional relationship among the principal objects in the image, the principal objects can be placed in desired positions.

Other Embodiments

Although the image processing method has been described in terms of a system for creating an album and printing it, the configuration is not limited thereto.

For example, the present invention may be used for layout in creating a home page (HP) on a world wide website (website), such as a photo gallery in which image data taken by a digital camera is placed.

It is needless to say that the present invention can be achieved by providing a system or apparatus with a storage medium (or a recording medium) that stores program codes for software that achieves the above-described functions of the embodiments and by reading the program codes stored in the storage medium by the system or apparatus.

In this case, the program codes themselves read from the storage medium achieve the above-described functions of the embodiments, and the storage medium that stores the program codes constitutes the present invention.

It is also needless to say that the above-described functions of the embodiments can be achieved not only by a computer executing the read program codes but also by an operating system (OS) that operates on the computer performing part or all of the actual processes.

Furthermore, it is needless to say that the above-described functions of the embodiments can be achieved when the program codes read from the storage medium are written to a function expansion card inserted into the computer or a memory provided in a function expansion unit connected to the computer, and the function expansion card or a CPU etc. provided in the function expansion unit performs part of all of the actual processes.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-250528, filed on Sep. 29, 2008, which is hereby incorporated by reference herein in its entirety.

What is claimed is:

1. An apparatus which automatically places a plurality of images in an image layout, the apparatus comprising:

a selection unit configured to select an image data from the plurality of images;

a specifying unit configured to specify a main subject position of a principal object in the image data selected by the image selection unit; and a layout unit configured to determine a layout position where the image data is to be placed in the image layout based on the specifying of the specifying unit, wherein, in response to the specifying unit specifying the main subject position of the principal object in the image data, the layout unit determines the layout position where the image data is to be placed, wherein the layout unit determines that the layout position of the image data selected by the selection unit is to be a right side in the image layout if an orientation of the principal object in the image data is specified as facing leftward by the specifying unit, wherein the layout unit determines that the layout position of the image data selected by the selection unit is to be a left side in the image layout if the orientation of the principal object in the image data is specified as facing rightward by the specifying unit, wherein the layout unit determines that the layout position of the image data selected by the selection unit is to be a right side in the image layout if the orientation of the principal object in the image data is specified as facing to a center by the specifying unit and the main subject position of the principal object is specified as a left side in the image data, and wherein the layout unit determines that the layout position of the image data selected by the selection unit is to be a left side in the image layout if the orientation of the principal object in the image data is specified as facing to a center by the specifying unit and the main subject position of the principal object is specified as a right side in the image data.

2. The apparatus according to claim 1, wherein, in response to the specifying unit specifying the main subject position of the principal object in the image data is other than center, the layout unit determines the layout position where the image data is to be placed is such that the principal object is automatically placed in the image layout in a layout position that is opposite to the main subject position of the principal object in the image data.

3. The apparatus according to claim 1, wherein the specifying unit further is configured to specify the orientation of the principal object in the image data selected by the image selection unit, wherein, in response to the specifying unit specifying the orientation of the principal object in the image data as center, the layout unit determines the layout position where the image data is to be placed in accordance with the specifying unit specifying a main subject position of a principal object in the image data, and wherein, in response to the specifying unit specifying the orientation of the principal object in the image data as other than center, the layout unit determines the layout position where the image data is to be placed in accordance with the result the specifying unit specifying the orientation of the principal object in the image data.

4. The apparatus according to claim 1, wherein the specifying unit further is configured to specify the orientation of the principal object in the image data selected by the image selection unit, wherein, in response to determining that there are a plurality of principal objects in the image data, a primary orientation of principal objects is determined to be an orientation having a largest count among the plurality of principal objects, the specifying unit specifies the primary orientation of principal objects as a resulting orientation of the plurality of principal objects in the image data selected by the image selection unit, and the layout unit determines a layout position where the image data is to be placed in the image layout based on the resulting orientation specified by the specifying unit.

5. The apparatus according to claim 4, wherein, in response to determining that it is not possible to determine an orientation having the largest count among the plurality of principal objects, the specifying unit specifies the orientation of the principal object in the image data as center.

6. The apparatus according to claim 1, further comprising a center-of-gravity calculation unit configured to obtain a center of gravity of the principal object, wherein the specifying unit specifies the main subject position of the principal object in the image data based on the obtained center of gravity.

7. The apparatus according to claim 1, further comprising a center-of-gravity calculation unit configured to obtain a center of gravity of the principal object, wherein, in response to determining that there is a plurality of principal objects in the image data, the specifying unit specifies the main subject position of a principal object in the image data based on the center of gravity of the plurality of principal objects obtained by the center-of-gravity calculation unit.

8. An automatic layout method for an apparatus which automatically places a plurality of images in an image layout, the automatic layout method comprising:

selecting an image data from the plurality of images; specifying a main subject position of a principal object in the selected image data; and determining a layout position where the image data is to be placed in the image layout based on the specifying, wherein, in response to specifying the main subject position of the principal object in the image data, determining includes determining the layout position where the image data is to be placed, wherein determining includes determining that the layout position of the selected image data is to be a right side in the image layout if an orientation of the principal object in the image data is specified as facing leftward, wherein determining includes determining that the layout position of the selected image data is to be a left side in the image layout if the orientation of the principal object in the image data is specified as facing rightward, wherein determining includes determining that the layout position of the selected image data is to be a right side in the image layout if the orientation of the principal object in the image data is specified as facing to a center and the main subject position of the principal object is specified as a left side in the image data, and wherein determining includes determining that the layout position of the selected image data is to be a left side in the image layout if the orientation of the principal object in the image data is specified as facing to a center and the main subject position of the principal object is specified as a right side in the image data.

9. A non-transitory computer-readable recording medium storing a computer program causing an automatic layout apparatus to perform the automatic layout method according to claim 8.

* * * * *